J. R. JACKSON & F. H. DAVIS.
TIME SERVICE CONTROLLING MECHANISM.
APPLICATION FILED NOV. 14, 1912. RENEWED AUG. 21, 1916.
1,220,340.
Patented Mar. 27, 1917.
3 SHEETS—SHEET 1.
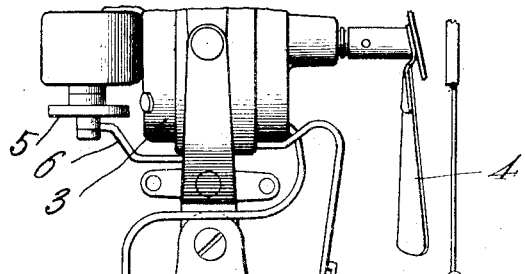
Fig. 1.
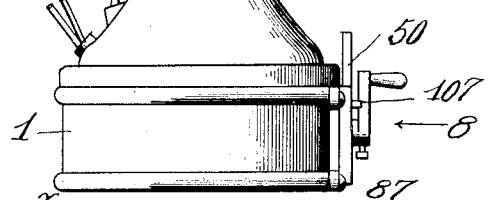
Fig. 2.
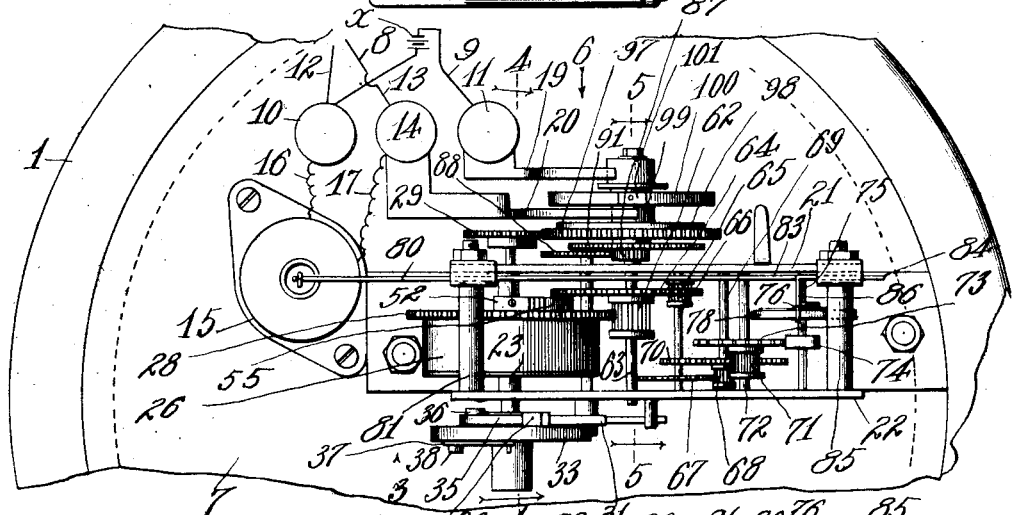
Fig. 3.
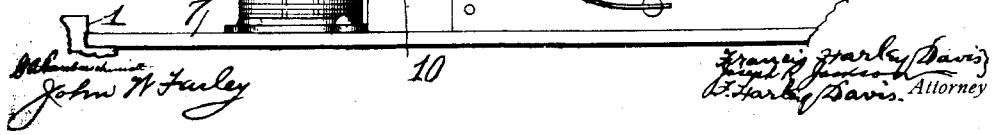
WITNESSES
John N Farley
INVENTORS
Francis Harley Davis
F. Harley Davis. Attorney

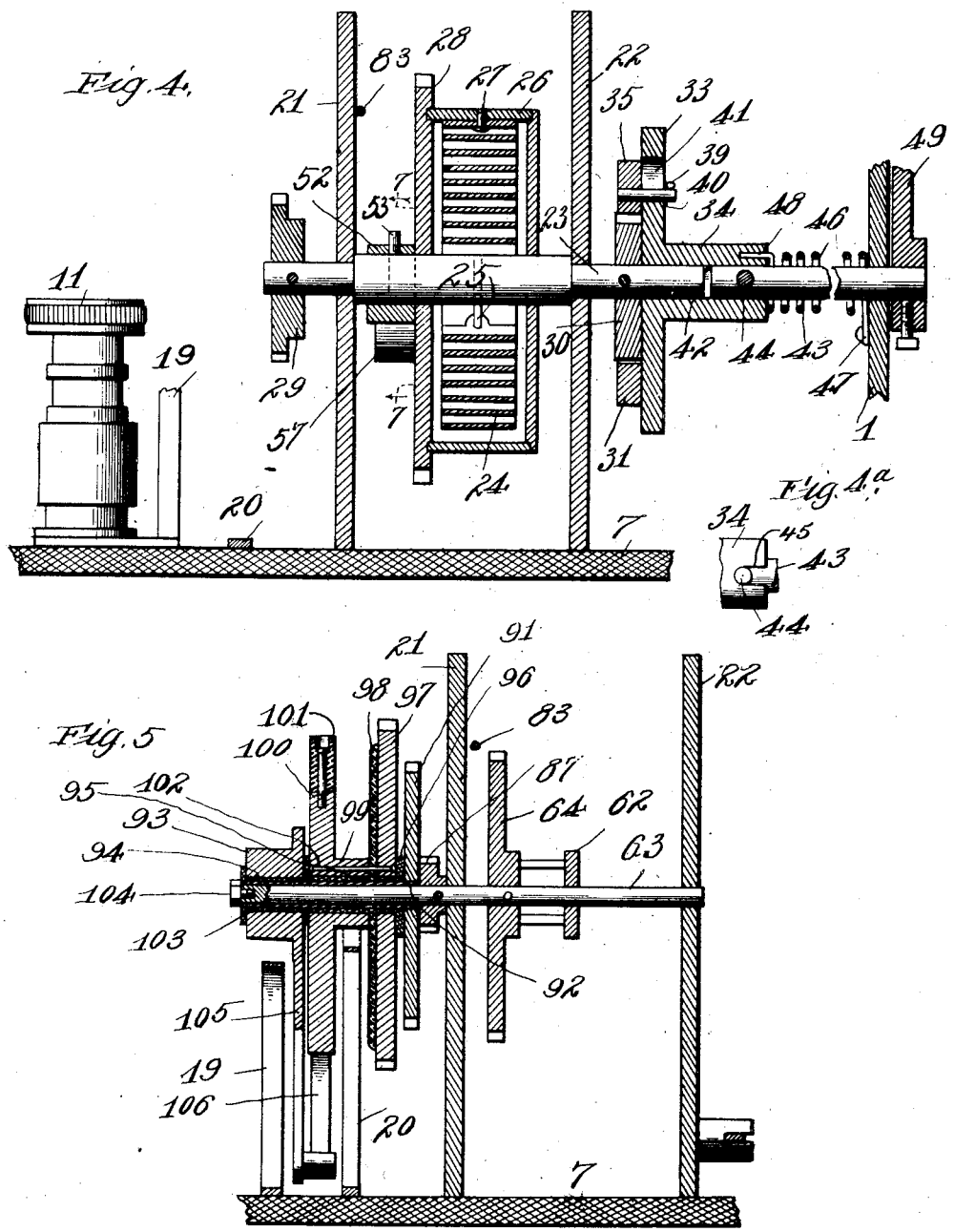

J. R. JACKSON & F. H. DAVIS.
TIME SERVICE CONTROLLING MECHANISM.
APPLICATION FILED NOV. 14, 1912. RENEWED AUG. 21, 1916.
1,220,340.
Patented Mar. 27, 1917.
3 SHEETS—SHEET 3.
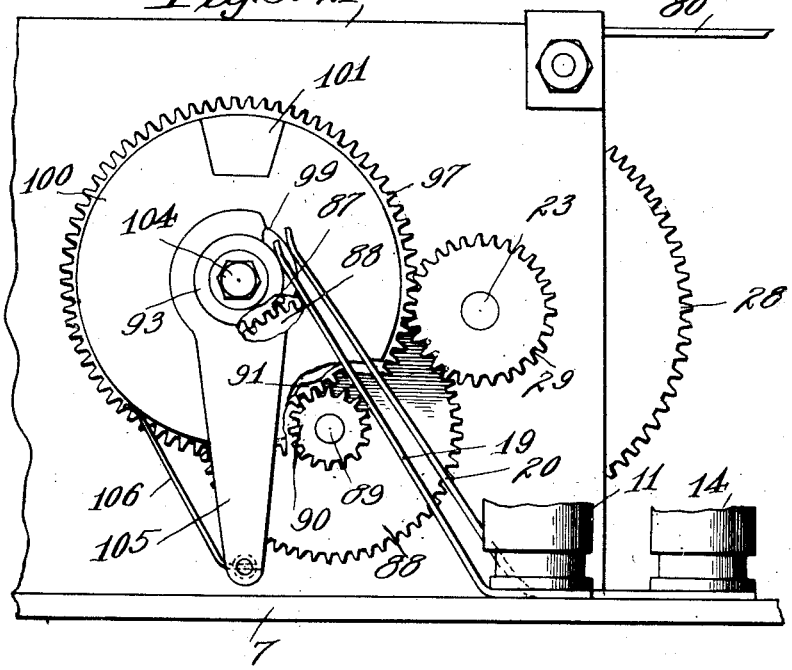
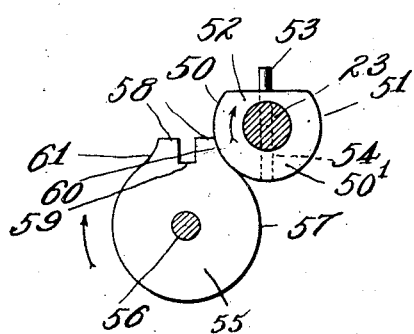
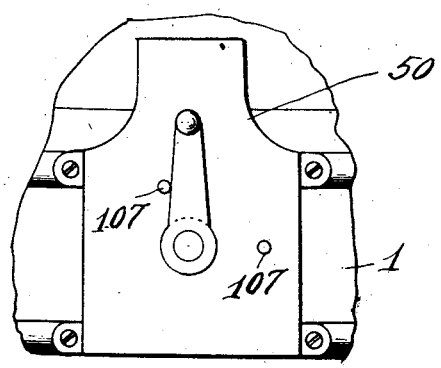

UNITED STATES PATENT OFFICE.

JOSEPH R. JACKSON AND FRANCIS HARLEY DAVIS, OF MEMPHIS, TENNESSEE, ASSIGNORS, BY MESNE ASSIGNMENTS, TO WILLIAM H. THOMPSON, OF MEMPHIS, TENNESSEE.

TIME-SERVICE-CONTROLLING MECHANISM.

1,220,340.  Specification of Letters Patent.  Patented Mar. 27, 1917.

Application filed November 14, 1912, Serial No. 731,324. Renewed August 21, 1916. Serial No. 116,192.

*To all whom it may concern:*

Be it known that we, JOSEPH R. JACKSON and FRANCIS HARLEY DAVIS, citizens of the United States, residing at Memphis, in the county of Shelby and State of Tennessee, have invented new and useful Improvements in Time-Service-Controlling Mechanism, of which the following is a specification.

This invention relates to a clockwork controlling mechanism for electrically governed or driven devices whereby such device may be operated for a predetermined time and then arrested or permitted to come to a position of rest at the expiration of such predetermined time.

In one untility of this invention the same may be applied to an electrically driven fan, adapted for use in any character of public or other place, with the device of this invention connected with the fan in such a manner as to permit the same to be started upon the insertion of a token check or coin, of a predetermined denomination or value, so that the buyer of fan service may start the fan and receive service therefrom for a period of time dependent upon the adjustment of the device of this invention, the same serving to arrest or cut out the fan upon expiration of the time limit of the service purchased.

It is one of the special features of this invention to so adapt the same to a fan that it may be employed in connection with any character of the various types of fans wherein the rotatable fan is moved or oscillated for the purpose of imparting ventilation throughout a relatively considerable area.

Other utilities of the device of our invention and further novel features and objects will be more fully described in connection with the accompanying drawings and will be more particularly pointed out in and by the appended claims.

In the drawings:—

Figure 1 is a view in elevation of one type of fan to which the device of our invention may be applied.

Fig. 2 is a plan view, on an enlarged scale, showing one form of our improved clockwork controlling mechanism.

Fig. 3 is a view in side elevation of the mechanism shown in Fig. 2.

Fig. 4 is a sectional view on line 4—4 of Fig. 2, showing the mechanism on a somewhat enlarged scale with respect to the scale of the mechanism shown in Fig. 2.

Fig. 4ª is a detail view of a part of Fig. 4.

Fig. 5 is a sectional view on line 5—5 of Fig. 2, looking in the direction of the arrow.

Fig. 6 is a side elevation of the mechanism shown in Fig. 2, looking in the direction of arrow 6 of Fig. 2.

Fig. 7 is a sectional view of a winding and unwinding limiting device for the clockwork taken on line 7—7 of Fig. 4.

Fig. 8 is a view looking in the direction of arrow 8 of Fig. 1.

Like characters of reference designate similar parts throughout the different figures of the drawings.

In order to clearly illustrate one advantageous utility of our invention, the same will herein be described in connection with an electrically driven fan but inasmuch as our invention is adapted for a wide range of other utilities, in functioning to control time service, it will be understood that we do not wish to be limited to the special utility of this invention herein disclosed.

As illustrated, a typical form of electrical fan is shown comprising a base 1, having a standard 2 on which the motor casing 3, of the fan 4, is movably mounted. Oscillation of the fan may be effected by a disk and crank connection, indicated at 5 and 6, or any other well-known form of means. The base 1 of the fan is hollow and in this embodiment of our invention the device thereof is disposed in the hollow base 1, and is mounted upon a suitable base of insulating material indicated at 7.

First briefly indicating the electrical connections so that the following detailed description will be rendered clear, 8 and 9 designate current supply lines of a circuit or conductors which are connected with a source of supply of current x, and with terminals such as binding posts 10 and 11, respectively. Conductors 12 and 13 lead from terminal binding posts 10 and 14, respectively, to the motor of the fan. An electrically operated device such, for instance, as a solenoid 15, is connected in circuit, in parallel, by wires 16 and 17 leading to binding posts 10 and 14, respectively. Inasmuch as the solenoid, as regards its specific construction, does not constitute a feature of our invention, the same will not be described in detail but it may be stated that when the solenoid is energized its core 18 will be elevated and that when the solenoid is deënergized the gravity action of the core can be utilized for arresting the clockwork, as will hereinafter more fully appear. A brush or wiping contact 19 is connected with binding post 11 and a brush or wiping contact 20 is electrically connected with binding post 14.

Next referring to the form of clockwork shown, the same may consist of clock sides 21 and 22 which may be suitably secured to the insulating base 7. The arbors of the wheels and other parts of the clock train are journaled in said sides 21 and 22 and the barrel or main arbor is indicated at 23. Arbor 23 is normally stationary and is designed to be moved only in one direction and such direction is that in which the spring 24 is to be wound. The main spring 24 has one of its ends secured to the arbor 23, as at 25, and the other end of the main spring 24 is secured to a going barrel 26, as indicated at 27. The barrel 26 is loosely mounted upon the arbor 23 and is rigidly connected with the first wheel 28 of the clock train, which is likewise loosely mounted on arbor 23. On one end of arbor 23 is rigidly mounted a setting wheel 29, the function of which is to set or advance certain parts to a predetermined extent to control the period of operation of the fan or other device controlled by the device of our invention. On the other end of the arbor 23 is rigidly mounted a ratchet wheel 30. The rigidly mounted ratchet wheel 30 is held against retractive movement in a direction opposite to the winding movement of the arbor 23, which winding movement is clockwise, and is permitted to rotate during winding movement of the arbor 23, by a spring pawl 31. Pawl 31 is pivoted at 32 to clock side 22, as will be seen by reference to Fig. 3. A pawl carrying member, preferably in the form of a disk 33 is loosely mounted on the arbor 23 and is provided with a hub 34. A pawl 35 is pivotally mounted on the disk 33, at 36, and engages the ratchet wheel 30, and is held in engagement therewith by a spring 37. One end of the spring 37 is secured at 38, and the free end 39 engages a pin 40, on the pawl 35, which projects through an opening 41 in the disk 33, as will be clearly seen by reference to Figs. 3 and 4. The hub 34 extends somewhat beyond the end 42, of the arbor 23, to receive the end of an actuating shaft 43. The actuating shaft is provided with a pin 44 having projecting ends which engage recesses or slots 45 in the outer end of hub 34, only one of said recesses being shown in Fig. 4ª. The foregoing construction provides for a detachable and non-rotatable pin and slot connection between the shaft 43 and the hub 34. A torsion spring 46, of the coil type, is interposed between a wall portion of the base 1, and the hub 34, and has one end secured to the base 1, at 47, and the other end projecting into the hub 34, at 48. The function of this spring is to return the disk 33, pawl 35 and connected parts to an initial position after the shaft 43 has been actuated. An actuating lever 49 is secured to the outer end of the shaft 43.

It will be understood that operation of lever 49, by the purchaser of fan or other service, cannot be effected until a coin or token of a predetermined denomination or value has been inserted in a suitable coin control device 50. The coin control device does not form subject matter of the present application and is not herein shown in detail.

Means is provided for limiting the winding and unwinding movement of the barrel 26 and said means constitute a clock stop device, which in the present construction is illustrated more particularly in Figs. 4 and 7, to which reference will now be made.

On the arbor 23 is rigidly secured or pinned a collar 50′ having a circular peripheral portion 51 and a mutilated or flattened portion 52, from which latter portion projects a tooth 53 which may be formed by an extension of a pin 54, to which the collar is secured to the arbor 23. Preferably on the first trained wheel 28 of the clock train is mounted at 56 a circular cam disk 55, which is provided with a circular periphery 57 having extensions 58 between which is formed a recess 59. Cam locking portions 60 and 61 connect the circular portion 57 with the projection 58.

In the operation of winding the arbor 23, and starting with the parts in the position as shown in Fig. 7, wherein the spring is nearly completely wound, the arbor 23 will be turned in a clockwise direction, (the first wheel 28 being stationary or practically so) until the tooth 53 engages the periphery 57 of the part 55. This will be the limit of the winding movement of the arbor and will indicate to the user that the spring is completely wound. The spring will operate the clockwork and unwind and in so doing the first wheel 28 will move in a clockwise direction with the cam locking surface 60 moving about the periphery 51, of the collar 50', clockwise, until the ends of the projections 58 come abreast of the mutilated portion 52, whereupon the projection 53 will enter the recess 59. This will serve to shift the part 55, on its pivot 56, to bring the cam portion 61 into engagement with the right hand side of the collar 50', and into engagement with the periphery 51 thereof. Continued rotation of the first wheel 28 in a clockwise direction will finally bring the remote portion, or that portion nearest the cam 61, into engagement with the tooth 53 and this will arrest the action of the spring and arrest the clockwork limiting the unwinding movement of the spring.

It will be understood that the winding and unwinding movement will cause a coaction of parts 50' and 55 in opposition to each other which will be in reverse relation, the one to the other, as regards winding and unwinding.

It will thus be seen that we have provided mechanical clock stop means which not only stops the clockwork at the limit of action of the spring, in unwinding, but also serves to stop the winding movement of the spring. The particular importance of this feature will hereinafter more fully appear.

The first wheel 28 meshes with a lantern pinion 62, mounted on a minute arbor 63. Tracing the clock train therefrom, wheel 64, on the minute arbor 63, meshes with lantern pinion 65, on arbor 66, which latter carries a wheel 67 meshing with pinion 68, on arbor 69. Arbor 69 carries a wheel 70, which meshes with pinion 71 on arbor 72. 73 is the escapement wheel mounted on arbor 72 and with which the pallet device, designated as a whole by 74, coacts. The pallet device is mounted on arbor 75 on which the usual forked escapement lever 76 is also mounted. The forked end of the escapement lever 76 engages the usual pin 77 of a balance wheel 78, mounted on arbor 79.

Reference will now be made to the connection between the core 18 of the solenoid 15, with the operating connection whereby the clockwork may be arrested by the solenoid, in cases where the solenoid is utilized.

The core 18 is connected with a bell crank lever 80, which may be pivotally mounted on one of the posts separating the clock sides 21 and 22, as indicated at 81. The remaining end 82, of the bell crank lever is connected with a rod 83, at one end of the latter, and the remaining end 84 thereof is bent U-shaped and is slidably mounted upon post 85. The terminal of the U-shaped end 84, indicated at 86, lies in the path of movement of the free end of the escapement lever 76.

It will readily be seen from the foregoing that when the solenoid 15 is energized, so as to elevate the core 18, the bell crank lever will move the rod 83 to the left in Fig. 3, thereby releasing the terminal 86 from engagement with the free end of the escapement lever 76 and permitting free movement of the escapement lever. On the other hand, when the solenoid 15 is deënergized, the core 18 thereof will drop by gravity and will move the rod 83, to the right of Fig. 3, thereby shifting the terminal end 86 into engagement with the escapement lever 76, so as to arrest the same.

On a constantly running member, such as a minute arbor 63, preferably outside of the clock side 21, is rigidly mounted a pinion 87 which meshes with a reducing gear, the larger member of which is a wheel 88 (Fig. 6) mounted upon a stud 89, secured to the clock side 21, and the smaller member of which is a pinion 90 preferably secured to the wheel 88. Wheel 88 meshes with pinion 87. The pinion 90 meshes with a gear wheel 91, mounted upon a metal sleeve 92, which is rotatively mounted upon the minute arbor 63. On the outer end of the sleeve 92 is mounted a contact hub 93 which is insulated from the metal sleeve 92 by a sleeve of fiber or like insulating material 94. The contact hub 93 and the wheel 91 are connected by the metal sleeve 92 so as to rotate in unison. A sleeve of fiber or like insulating material 95 is loosely mounted upon the metal sleeve 92 and is provided with a flange 96 that separates wheel 91 from gear wheel 97. Gear wheel 97 is thereby insulated from the metal sleeve 92, and wheel 91, and on the other side of wheel 97 is a disk of insulating material 98. A contact hub 99 is mounted upon the insulating sleeve 95 and is provided with a disk 100 which has a segment of insulating material 101, the purpose of which will hereinafter more fully appear. Disk 100 and its hub 99 are connected by a pin 102, or like suitable means, with wheel 97 so that disk 100 and wheel 97 rotate together and independently of wheel 91 and hub 93, which latter two parts rotate together.

All of the foregoing parts are held in place between pinion 87 and a suitable washer 103, preferably of insulating material, by screw 104, which may be threaded into the arbor 63. Brush 19 is continuously in wiping engagement with contact hub 93, and brush 20 is continuously in wiping engagement with contact hub 99. Hub 93 is provided with an arm 105 which carries a brush 106 adapted to engage the periphery of disk 100.

It has been seen from the foregoing how hub 93 is driven by wheel 91, from the reducing gears 90, and 88, from pinion 87 direct from the minute arbor 63. Wheel 97 meshes with wheel 29, which latter is mounted upon the main arbor 23, as hereinbefore described, and wheel 97 is therefore only driven when arbor 23 is turned to wind the spring, arbor 23 being otherwise held stationary by pawl 21.

It will be seen from the foregoing that the hub 93, and the brush 106, carried thereby, are rotated so as to advance the brush 106 along the periphery of the disk 100 toward and to overtake the insulated segment 101, arm 105 being moved from the minute arbor 63 with a reducing gear which may be assumed to be timed or of such proportions as to advance the brush 106 along the periphery of the disk 100 one-twelfth of a revolution in a period of time equal to one hour for each hour that the mechanism is energized. In other words, the brush 106, although driven by the minute arbor 63, has a rate of travel comparative to the rate of travel of the hour hand, with respect to the minute hand, in the embodiment shown. Now if the disk 100, through the wheel 97, is connected with the winding arbor 23, in such geared relation that at the time the arbor 23 is given a definite winding turn, or portion of a turn, the disk 100 with its insulating segment 101 is advanced before or ahead of the brush 106 such a distance as would equal one-twelfth of a complete revolution, then, every time the insulating segment is advanced one-twelfth of a revolution it would take the brush 106 one hour to reach the segment, in accordance with the arbitrary standard selected for a specific illustration of the action of the device herein shown.

Current will pass through brush 19 to hub 93, arm 105, and brush 106, through disk 100, to contact hub 99, and back through brush 20. Now as long as the brush 106 is in contact with the metal portion of the disk 100 the circuit will be completed or closed, through the foregoing path, and, through the connections hereinbefore described the solenoid will then become energized. It will be understood that when the solenoid is energized the core will be elevated and the escapement lever will be free to operate. Keeping in mind that the disk will be normally stationary, and that the brush 106 will advance along the periphery toward the insulated segment 101, it will be seen that when brush 106 reaches the insulated portion 101, circuit will be broken, and the solenoid 15 will be deënergized whereupon the core thereof will drop by gravity and cause an arrest of movement of the escapement lever 76. This will stop the clockwork, and will also open the circuit so as to prevent current from flowing through conductors 12 and 13 to the fan or other device to which current is supplied for operation and cause such device to come to a position of rest. In the event that the solenoid core should fail to drop, or in the event that the solenoid should otherwise fail to stop the clockwork, after circuit had been opened by the brush 106 reaching the insulated segment 101, then the device set forth in connection with Fig. 7, would serve to stop the clockwork before the brush 106 had passed completely across the insulated segment. It will be seen that in the most preferred embodiment of the invention, that we rely upon the opening of the circuit to cause the solenoid to arrest movement of the clockwork and that during the ordinary operation of the device herein set forth, the solenoid will arrest movement of the clockwork by being deënergized but in the event that the solenoid failed to work, the device in Fig. 7, would stop the clockwork and is preferably so set to stop the clockwork within a few minutes after the circuit has been opened by the brush 106 reaching the foremost or adjacent edge of the insulated segment, and before the brush 106 had passed completely over the insulated segment 101.

In this connection it will be understood that starting practically with the parts at zero, or with the main spring tensioned only slightly beyond zero, the lever 49 will be operated by the user to a uniform extent at each time, to wind the spring a uniform amount dependent upon the predetermined amount of stroke provided for the lever 49. If the purchaser of service drops in one nickel, for instance, he will be able to give the lever 49 a turn of a predetermined length of stroke. The purchaser may, however, decide to drop in two or three nickels in succession and an accumulative wind of the mainspring 24 may be obtained in successive turns of the lever 49 which will wind up the spring 24 sufficiently to vend, say, 15 cents' worth of service by the fan. At each time that the lever 49 is given a turn, or a partial turn whatever the predetermined limit of movement may be, the segment 101 will be moved a given distance in advance of the brush 106. If one nickel is deposited the segment will be moved in advance of the brush 106 one-twelfth of a revolution. If two nickels are dropped in, the segment will be moved in advance of the brush 106 twice as far.

It will be clear from the foregoing that the disk 100 should never be moved throughout a complete circle as in such event, or in the event that it were rotated slightly more than one complete circle, the brush 106, as in all cases, would open circuit as soon as it reached the segment 101. It will therefore be seen that if the purchaser operated the lever 49 successively for a number of times such as would advance the disk 101 for a complete or more than a complete revolution, he would not receive the service for which he paid. Therefore the mechanical stop devices 50' and 55 are so timed and proportioned that they will prevent winding, either continuous or successive, as the case may be, to such an extent as would rotate the disk 100 a complete revolution, and said device is preferably so timed and proportioned as to automatically arrest winding movement prior to the complete rotation of the disk 100.

The throw of the lever 49 may be limited by a stop 107, as indicated in Figs. 1 and 8, so as to energize the machine to vend service for a predetermined time according to the local service rate.

It will be seen from the foregoing that the arm 105, and the brush 106, move in the same direction in which the disk 100 moves when rotated and that at whatever point the insulated segment 101 stops, and at whatever point the brush 106 advances toward such segment, the parts will subsequently be started from the point at which it previously stopped and therefore no return movement is necessary to a given starting position. The brush 106 and disk 100 with its segment 101, may constitute means for making and breaking a circuit composed of two elements, one being operated by a normally running member of the clockwork and the other being operated by a normally stationary part of the winding device.

It will be seen that at least one of the coacting elements constituting the make and break device for the circuit, which in the present instance is the disk 100, may broadly be considered to be an adjustable element which is herein shown as being adjusted by movement of the main arbor 23.

It will be further obvious that the drag on the clockwork is reduced to a minimum by reason of the fact that the only braking action on the clockwork results from the light drag of the brush 106, and the brushes 19 and 20, the friction of which is so inconsiderable as to be practically nugatory as regards any defective action of the clockwork itself.

It will also be noted from the foregoing that while we have herein shown and described a solenoid for arresting movement of the clockwork when the circuit is opened, still it will be obvious that in some utilities of the invention reliance can be placed upon the clock stop means shown in Fig. 7, to perform this function, in the absence of a separate device, such as a solenoid, or any similar arresting mechanism.

While we have herein shown and described the specific form of our invention, we do not wish to be limited thereto except for such limitations as the claims may import.

We claim:—

1. In apparatus of the character described, clockworks comprising a winding arbor and a running arbor, a contact disk rotatably mounted upon the running arbor and insulated therefrom and provided near its periphery with an insulating member, gearing connecting the winding arbor and contact disk whereby the disk is turned in one direction upon the rotation of the winding arbor, a contact hub rotatably mounted upon the running arbor upon one side of the contact disk and insulated from the running arbor and the contact disk, connecting means between the contact hub and the running arbor, an arm connected with the contact hub to rotate therewith, a contact carried by the arm and contacting with the periphery of the contact disk to engage with the insulating member carried thereby, a second contact hub electrically connected with the contact disk, contact members permanently contacting with the contact hubs, a circuit connected with the contact-members, and automatic means to arrest the turning movement of the winding arbor before it effects a complete revolution of the contact disk.

2. In apparatus of the character described, clockworks comprising a winding arbor and a running arbor, a contact disk rotatably mounted upon the running arbor and insulated therefrom and provided upon its outer portion with an insulating member, gearing connecting the winding arbor and contact disk whereby the disk is turned in one direction upon the rotation of the winding arbor, a contact hub carried by the running arbor and insulated therefrom, connecting means between the running arbor and the contact hub, an arm connected with the contact hub to rotate therewith, a contact carried by the arm and contacting with the outer portion of the contact disk to be brought into contact with the insulating member thereof, a second contact hub electrically connected with the contact disk, contact members permanently contacting with the contact hubs, and a circuit connected with the contact members.

3. In apparatus of the character described, clockworks, comprising a winding arbor and a running arbor, a rotatable contact member, gearing connecting the contact member and the winding arbor whereby the contact member is turned upon the rotation of the winding arbor, a co-acting contact member arranged near the first named contact member and adapted to partake of a turning movement with relation thereto, means whereby the second named contact member is operated by the running arbor, and means to arrest the turning movement of the winding arbor before the first named contact member has been turned thereby for a complete revolution.

4. In apparatus of the character described, clockworks, means to wind the clockworks, a rotatable pursued contact connected with and driven by the winding means, a rotatable pursuing contact coöperating with the pursued contact and driven by the clockworks, and means to arrest the operation of the winding means before it has turned the rotatable pursued contact for a complete revolution.

In testimony whereof we affix our signatures in the presence of two witnesses.

JOSEPH R. JACKSON.
FRANCIS HARLEY DAVIS.

Witnesses:
G. W. JONES,
JOHN W. FARLEY.